(12) United States Patent
Tu et al.

(10) Patent No.: US 6,828,691 B2
(45) Date of Patent: Dec. 7, 2004

(54) SINGLE BODY MOTOR/GENERATOR DUAL FUNCTION DEVICE

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 0 days.

(21) Appl. No.: 10/170,355

(22) Filed: Jun. 14, 2002

(65) Prior Publication Data

US 2003/0227227 A1 Dec. 11, 2003

(30) Foreign Application Priority Data

Jun. 6, 2002 (TW) .......................... 91112164 A

(51) Int. Cl.[7] .......................... H02K 7/10; H02K 49/00; H02P 15/00; H02P 9/04; F02N 11/00
(52) U.S. Cl. .............................. 290/40 C; 310/102 R; 310/100
(58) Field of Search .............................. 310/100, 102 R, 310/156, 154, 154.02, 102; 290/40 C; 180/65.2–65.5

(56) References Cited

U.S. PATENT DOCUMENTS

| | | | |
|---|---|---|---|
| 1,284,664 A | 11/1918 | Hamrick ...................... 290/16 |
| 1,562,903 A | 11/1925 | Miller ......................... 180/65.3 |
| 3,899,041 A | 8/1975 | Mager ......................... 180/65.8 |
| 4,222,450 A | 9/1980 | Fobbs ......................... 180/65.3 |
| 4,305,254 A | * 12/1981 | Kawakatsu et al. ............ 60/716 |
| 4,335,429 A | * 6/1982 | Kawakatsu .................. 701/102 |
| 4,637,274 A | 1/1987 | Goldenfeld .................. 74/625 |
| 4,753,078 A | * 6/1988 | Gardner, Jr. ................. 60/668 |
| 5,075,616 A | * 12/1991 | Mitsui .......................... 322/10 |
| 5,215,156 A | 6/1993 | Stulbach et al. ............ 180/65.3 |
| 5,343,970 A | * 9/1994 | Severinsky ................ 180/65.2 |
| 5,346,031 A | * 9/1994 | Gardner ....................... 180/179 |
| 5,549,172 A | 8/1996 | Mutoh et al. .............. 180/65.1 |
| 5,704,440 A | * 1/1998 | Urban et al. ................ 180/65.2 |
| 5,715,291 A | * 2/1998 | Momose ...................... 378/84 |
| 5,842,534 A | * 12/1998 | Frank ......................... 180/65.2 |
| 5,923,093 A | * 7/1999 | Tabata et al. ............. 290/40 C |
| 6,034,492 A | 3/2000 | Saito et al. ................. 318/149 |
| 6,048,288 A | * 4/2000 | Tsujii et al. ................... 477/5 |
| 6,054,776 A | * 4/2000 | Sumi ........................... 290/17 |
| 6,082,476 A | 7/2000 | Stulbach .................... 180/65.3 |
| 6,157,149 A | 12/2000 | Ohnuma ..................... 318/139 |
| 6,179,078 B1 | * 1/2001 | Belloso ....................... 180/69.6 |
| 6,209,672 B1 | * 4/2001 | Severinsky ................ 180/65.2 |
| 6,328,122 B1 | * 12/2001 | Yamada et al. ............ 180/65.3 |
| 6,380,638 B1 | * 4/2002 | Bitsche et al. ............ 290/40 C |
| 6,490,511 B1 | * 12/2002 | Raftari et al. ................. 701/22 |
| 6,563,248 B2 | * 5/2003 | Fujita ......................... 310/181 |
| 6,570,265 B1 | * 5/2003 | Shiraishi et al. .......... 290/40 C |
| 6,590,312 B1 | * 7/2003 | Seguchi et al. ............. 310/266 |

* cited by examiner

*Primary Examiner*—Joe Waks
*Assistant Examiner*—Julio C. Gonzalez
(74) *Attorney, Agent, or Firm*—Bacon & Thomas, PLLC

(57) ABSTRACT

A dual function motor/generator includes a rechargeable battery, a mode switching device, a dual function rotor/stator structure, at least two transmission devices and a clutch device for selecting one of the two transmission devices depending on whether a motor or generator mode is selected. When the dual function motor/generator is used as a motor, power is supplied from the rechargeable battery controlled by the mode switching device to a driven load through the rotor/stator structure and one of the transmission devices, and when used as a generator, the battery is recharged by applying an external force to the load such that the load drives the other transmission device to rotate the rotor in a direction opposite a direction of rotation of the rotor in the motor mode, and thereby induce an electric current in the rotor/stator structure to recharge the battery.

9 Claims, 3 Drawing Sheets

SINGLE BODY MOTOR/GENERATOR DUAL FUNCTION DEVICE

BACKGROUND OF THE INVENTION

1. Field of the Invention

The invention relates to a dual function motor/generator device, and particularly to a single device having dual functions of being able to be used as a motor and generator.

2. Description of the Related Art

Conventionally, an engine or a motor drives an apparatus using an additional power system for supplying electricity. Driving of the load, which is achieved by such engine and motor, normally needs individual generator means and driving apparatus. Therefore, it requires tremendous space and has a high cost. Moreover, it has poor industrial applicability.

To solve the problems mentioned above, a motor with one additional armature and one additional winding thereon associated with a switching device has been developed and produced to add generator functions to the motor. However, the change of connection between motor and generator circuits causes electrical problems, and the manufacture of motor with one additional armature and one winding thereon is complicated, is subject to manufacturing defects and increases the manufacturing cost. Consequently, it has been desired to develop a single device having dual functions of being able to be used as both a motor and a generator.

SUMMARY OF THE INVENTION

An object of the present invention is, therefore, to provide a single device having the dual functions of being able to be used as a motor and a generator without any of the problems mentioned above. The invention provides a single, shared component motor/generator dual function device comprising a rechargeable battery, a switching means, a dual function motor/generator means, at least two transmission devices and a forward/reverse clutch means for alternately engaging said transmission devices. When the dual unction motor/generator means is used as a motor, power is supplied from the rechargeable battery under control of a switching means to the stator or rotor and to a driven load through a first transmission device selected by the forward/reverse clutch means, and when used as a generator, the battery is recharged by applying an external force to the driven load such that the load drives a second transmission device to drive the rotor in a direction opposite the first direction of rotation when operated as a motor, and induce an electromotive force through magnetic coupling between the stator and rotor to recharge the battery.

It is also an object of the present invention to provide a single body motor/generator dual function device comprising a rechargeable battery, a switching means, a dual function motor/generator means including a rotor and stator, and rotor rotating-direction selection means, wherein the stator is made from permanent magnetic material and the rotor has coil windings.

Another object of the present invention is to provide a single body motor/generator dual function device of the above-mentioned type, wherein the stator is made from permeable material wound by coil windings and the rotor is made from permanent magnetic material.

According to another aspect of the present invention there is provided a single body motor/generator dual function device, wherein the stator and rotor are both made from permeable material wound by coil windings, and the device further comprises at least a starting switch, a feedback switch, and a rectifier. The two switches are initially closed at the same time when the device is used as a generator. The rechargeable battery provides a potential to windings of the rotor through the starting switch, and the induced potential further contributies to the magnetic field of the stator/rotor structure. As the rotor moves in a pre-determined direction relative to the stator, a first portion of the electromotive force induced by the magnetic field feeds back to the coil windings of the rotor through the rectifier and the feedback switch. Then, the starting switch is opened and the main portion of the electromotive force is used to charge the battery through the above-described switching means while the first portion of the electromotive force continues to be fed back to the rotor winding. The starting switch remains opened after starting until stoppage of the external force applied to the driven load.

In accordance with a further aspect of the present invention there is provided a single body motor/generator dual function device of the above-described type that further includes a differential, torque converter, and/or additional transmission device for enabling a change of torque, velocity, direction, or other required functions.

Furthermore, according to another aspect of the present invention there is provided a single body motor/generator dual function device of the above-described type, wherein the rotating-direction selection means can interlock with the switching means or be independently controlled.

Other objects, features and advantages of the present invention will become apparent to those skilled in the art from the following detailed description.

DETAILED DESCRIPTION OF PREFERRED EMBODIMENTS

Figure 1:
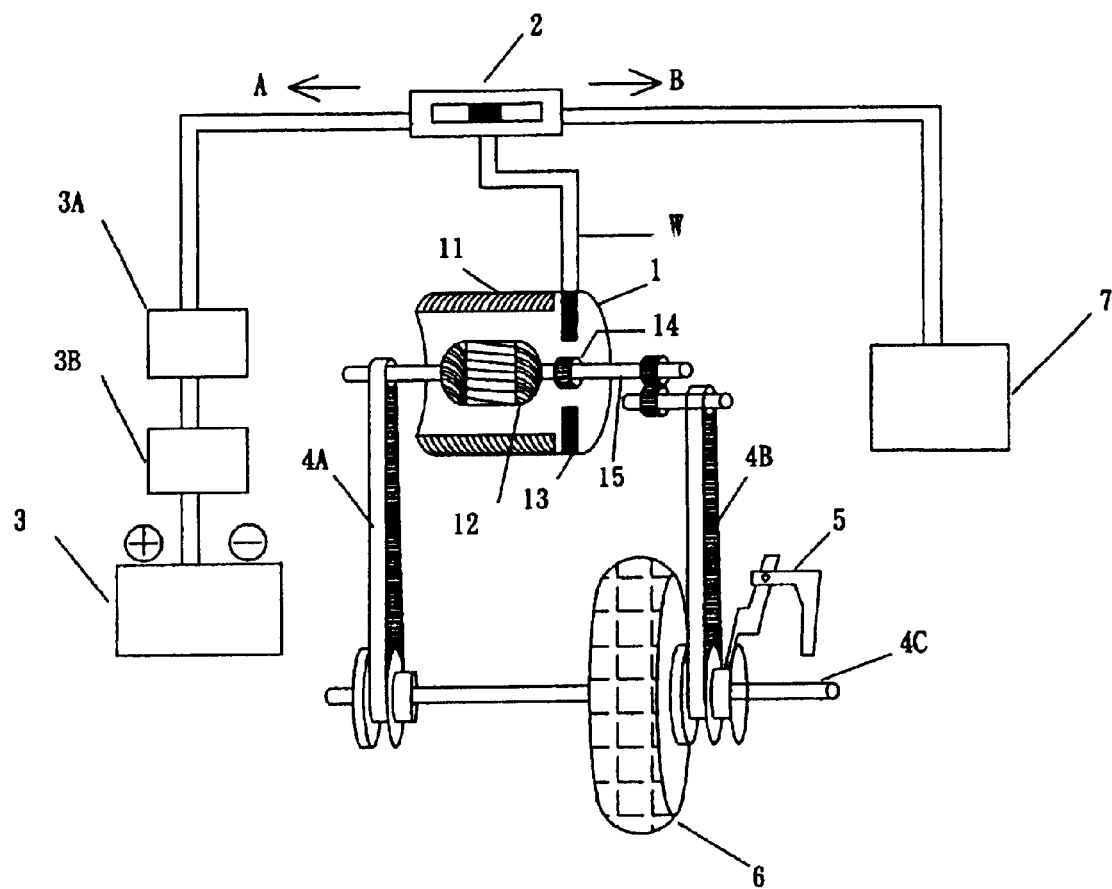
FIG. 1 is a schematic drawing of the single body motor/generator dual function device according to a first embodiment of the present invention.

A single body motor/generator dual function device, as shown in FIG. 1, includes a dual-function motor/generator device 1, a switching means 2 for switching between a motor mode and a generator mode, a rechargeable battery 3, a first transmission device 4A, a second transmission device 4B, a power output device 4C including a differential. Torque converter, or third transmission device 4E (hereinafter referred to as a differential) and a forward/reverse clutch means 5. The dual-functional motor/generator device 1 has a stator 11 made from a permanent magnet, a rotor 12 wound by coil windings, a brush 13 and a commutator 14. The two ends of shaft 15 of the rotor 12 connect with the differential 4C through the first transmission device 4A and the second transmission device 4B respectively. The differential 4C connects with a load 6 such as a wheel.

The switching means 2 includes a switch and preferably controls the forward/reverse clutch means 5 through an interlock control device (not shown), Namely, the forward/reverse clutch means 5 is changed to a first position, in which the second transmission device 4B is engaged, through the interlock control device when the switching means 2 is located at the motor-driving position B. The forward/reverse clutch means 5 is changed to a second position, in which transmission device 4A is engaged, through the interlock control device when the switching means 2 is located at the generator position A and simultaneously the driven load 6 rotates. Alternatively, the switching means 2 and the forward/reverse clutch means 5 can be operated individually.

A rectifier 3A and voltage/current regulator 3B can be set at the front of the rechargeable battery 3. The dual-functional motor/generator device 1 is connected to a driving controller such as speed regulator 7 so as to control the velocity of shaft 15. It will be appreciated that speed regulator 7 may provide all necessary motor driving and control functions including starting and stopping control, torque regulation, phase control, voltage and current control, and so forth.

When the switching means 2 is located at the motor-driving position B for selecting a motor mode, the rechargeable battery 3 supplies power through speed regulator 7, a connecting wire W, brush 13, and commutator 14 to the coil windings of rotor 12 of the dual-functional motor/generator device 1 so as to apply an electromotive force which causes the rotor 12 to rotate due to magnetic coupling with the magnetic field of permanent magnet 11, in a pre-determined first direction such as clockwise. At this stage, according to Fleming's Left Hand Rule, the dual-functional motor/generator device 1 is used as a motor so as to drive the transmission device 4B by means of shaft 15, and then to drive the driven load 6 through differential 4C. Further, the differential 4C may have functions for controlling torque, velocity, direction or other required functions.

When the switching means 2 is located at the generator position A for selecting a generator mode, the forward/reverse clutch means 5 is simultaneously changed to another location by interlocking or other operation. The driven load 6 rotates upon application of an external force, and the transmission device 4A engages shaft 15. Thereby, the rotor 12 rotates in a second direction opposite the direction of position B, and an electromotive force is generated by coupling between the magnetic field of permanent magnet 11 and the magnetic field induced in the coil winding of rotor 12. At this stage, according to the Fleming's Left Hand Rule, the dual-functional motor/generator device 1 is used as an electric generator. The resulting electromotive force is coupled through commutator 14 and brush 13, and the voltage output through brush 13 is supplied to a connecting wire W and switching means 2 at position A, and then directly to rectifier 3A. Further, the voltage is adjusted into a stable and specific voltage/current through voltage/current regulator 3B and then applied to recharge the rechargeable battery 3.

Figure 2:
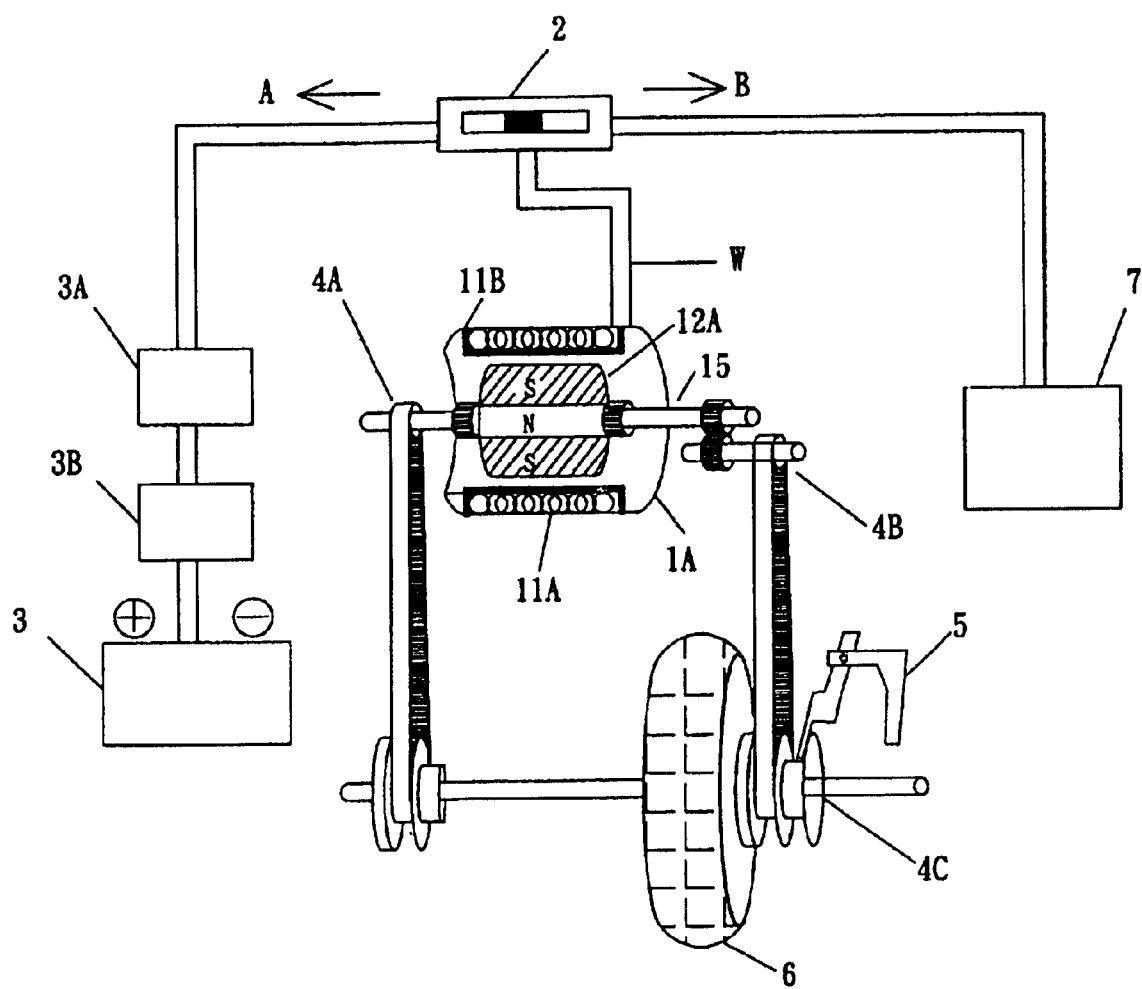
FIG. 2 is a schematic drawing of the single body motor/generator dual function device according to a second embodiment of the present invention.

The drawing shown in FIG. 2 is the illustration of the second embodiment according to the present invention. The same symbols of elements have the same meaning as shown on FIG. 1. In this embodiment, all elements are the same except that the stator includes a coil winding 11A wound on a magnetically permeable material 11B, and the rotor is made from a permanent magnet, coil winding 11A being connected directly to wire W without the commutator and brush.

When switching means 2 is located at the motor-driving position B, the rechargeable battery 3 supplies power through speed regulator 7 to coil winding 11A of the stator to generate a magnetic field which couples with the magnetic field of the permanent magnet of rotor 12 and thereby causes the rotor to rotate so as to drive the transmission device 4B. Subsequently, the driven load 6 rotates through differential 4C.

When the switching means 2 is located at generator position A, the forward/reverse clutch means 5 is changed to a second position. Then, when the load 6 is rotated by applying an external force, in the same manner as embodiment 1, the rotor 12 rotates in a second direction opposite to the motor-diving direction by means of rotation of the transmission device 4A, and generate an electromotive forte induced by the coupling of the magnetic field of permanent magnet 11A with the magnetic field of the coil winding. Subsequently, the electromotive force recharges the rechargeable battery 3.

Figure 3:
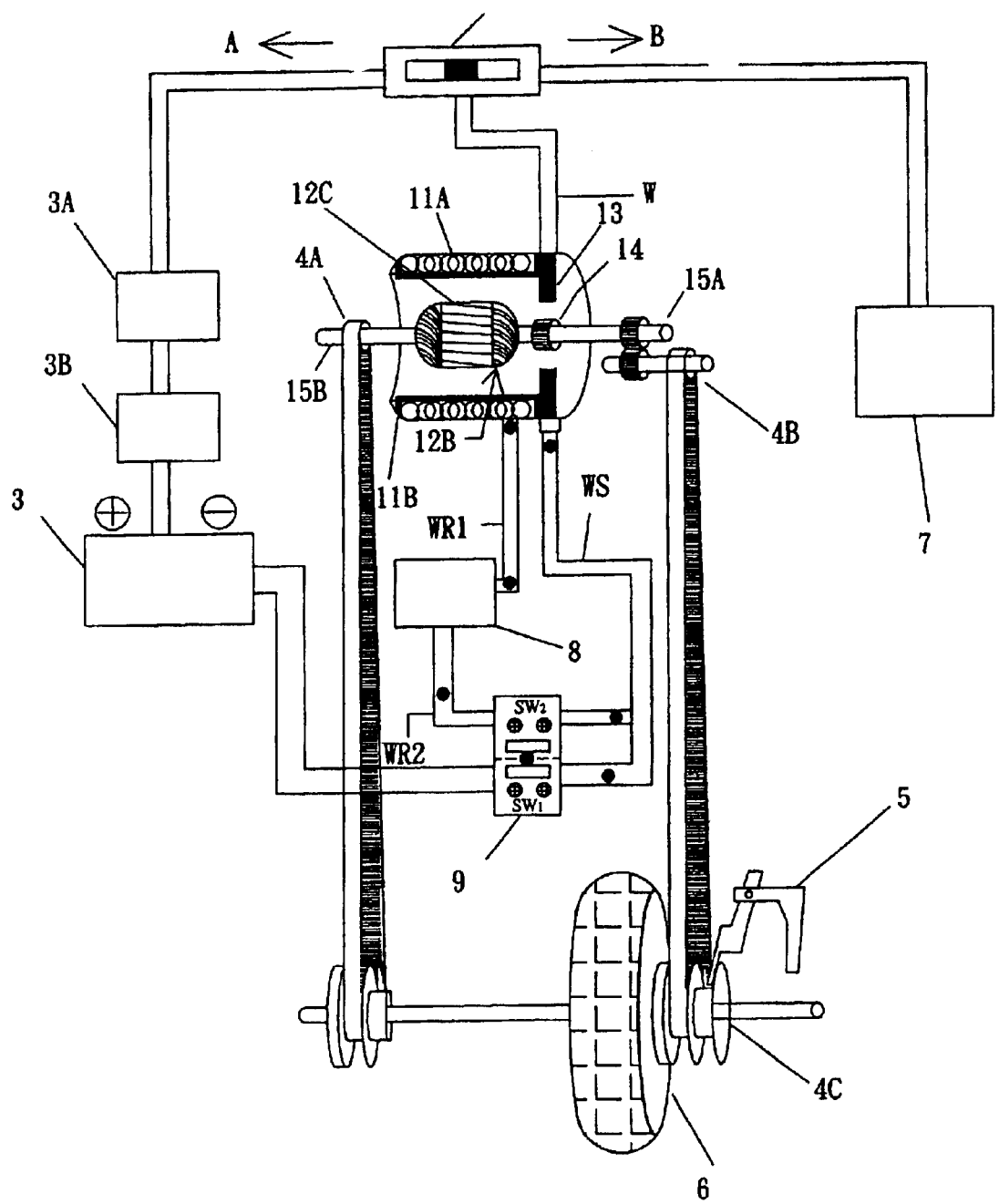
FIG. 3 is a schematic drawing of the single body motor/generator dual function device according to a third embodiment of the present invention.

The drawing shown in FIG. 3 is the third embodiment according to the present invention, in which the stricture of stator is the same as embodiment 2, and the rotor is wound with coil winding 12B located on magnetically permeable material 12C. Further, this embodiment includes a rectifier 8 and a starting switch 9. The coil winding 11B of the stator connects with the input of the rectifier 8 through the first wire WR1. The output of rectifier 8 connects with starting switch 9 through the second wire WR2. The starting switch 9 consists of a starting switch SW1 and a feedback switch SW2, which connect with brush 13 through the starting power line WS.

When used as a motor, in the same manner as the embodiment mentioned above, rechargeable battery 3 supplies power through speed regulator 7 to coil winding 11A of the stator to generate a magnetic field which couples with the magnetic field induced in the coil winding and permeable magnetic material of rotor 12. Thereby, the rotor rotates in a predetermined first direction so as to drive the transmission device 4B.

However, when the motor/generator device is used as an electric generator, the switching means 2 is set at the position A and simultaneously causes the switches SW1 and SW2 to be initially closed. The rechargeable battery 3 supplies a voltage to coil windings 12 B of the rotor through the starting power line WS, brush 13 and rectifier 14, and thereby generates a magnetic, field. The rotor thus rotates in a predetermined second direction opposite the first direction and causes a magnetic field to be induced in the stator. The resulting coupling of the stator and rotor fields causes an electromotive force to be generated in the stator winding 11A. A portion of the resulting electromotive force is transmitted to the rectifier 8 through the first wire WR1 and fed back to rotor 12B through the second wire WR2, switch SW2 and starting wire WS so that electric power is generated continuously. At this stage, the starting switch SW1 may be opened. On the other hand, the feedback switch remains in a closed condition to continue to supply power to the rotor and the main portion of power is supplied to the battery through switching means 2 until the external force applied to driven load 6 is stopped, and then starting switch SW1 is closed again during re-start.

In accordance with the illustration of embodiments mentioned above, the technical concept, according to the present invention, is to provide a single motor/generator dual function device comprising a rechargeable battery, a switching means, transmission devices, a forward/reverse clutch means, and a driven load, by using the principle of nature that a motor rotates in one direction but an electric generator rotates in an opposite direction.

It should be understood, however, that the detailed description and specific examples, while indicating preferred embodiments of the present invention, are given by way of illustration and not limitation. Many changes and modifications, such as adding an indicator of current to the rechargeable battery 3, optionally including an overcharging device, battery, etc., or any modification of the transmission device, connecting means and so on are within the scope of the present invention and may be made without departing from the spirit thereof, and the invention includes all such modification.

| Reference Characters of the Drawing | |
|---|---|
| 1 | dual function motor/generator means |
| 2 | switching means |
| 3 | rechargeable batteiy |
| 4A, 4B, 4C | transmission device |
| 5 | forward/reverse clutch means (rotating direction selection device) |
| 6 | driven load |
| 7 | speed regulator |
| 8 | rectifier |
| 9 | starting switch |

What is claimed is:

1. A single body motor/generator dual function device comprising a rechargeable battery, a switching means for switching between a motor mode and a generator mode, a rotor and stator structure including a rotor and a stator, at least two transmission devices and a forward/reverse clutch means for selectively connecting one of said two transmission devices between said rotor and a power output device connected to a load depending on whether said motor/generator is in said motor mode or said generator mode, wherein when the switching means is located at a first position, power is supplied from the rechargeable battery to the rotor and stator structure, and a first of the two of the transmission devices is connected between the rotor and the power output device such that the rotor transmits power to the output device through the first transmission device, and wherein when the switching means is located at the second position, the rotor and stator structure is used as a generator, and the battery is recharged upon applying external force to the load and selecting a second of said two transmission devices such that the load drives the second transmission device to rotate the rotor and induce an electromotive force that recharges the battery.

2. The single body motor/generator dual function device as claimed in claim 1, wherein the stator is made from permanent magnetic material and the rotor has coil windings.

3. The single body motor/generator dual function device as claimed in claim 1, wherein the stator is made from permeable material wound by coil windings and the rotor is made from permanent magnetic material.

4. The single body motor/generator dual function device as claimed in claim 1,wherein the stator and rotor are both made from permeable material wound by coil windings, and the device further comprises at least a starting switch, a feedback switch, and a rectifier, wherein the two switches are initially closed at the same time when the device is used as a generator and an external force is applied to the load, at which time the rechargeable battery provides a potential to windings of the rotor through the starting switch and causes the rotor to move in a pre-determined direction relative to the stator, and wherein a first portion of electromotive force induced in the stator windings is fed back to the coil windings of the rotor through the rectifier and the feedback switch, and wherein the starting switch is then opened so that the main portion of the electromotive force is supplied to the battery through the switching means while the first portion of the electromotive force continues to be fed back to the coil windings of the rotor to generate power by induction until the stoppage of the external force applied to the load.

5. The single body motor/generator dual function device as claimed in claim 1, wherein the forward/reverse clutch means is interlocked with the switching means such that the switching means causes the forward/reverse clutch means to switch between said first and second transmissions.

6. The single body motor/generator dual function device as claimed in claim 1, wherein the forward/reverse clutch means is controlled independently of the switching means.

7. The single body motor/generator dual function device as claimed in claim 1, wherein said two transmissions are respectively connected at opposite ends of said rotor.

8. The single body motor/generator dual function device as claimed in claim 1, further comprising a shaft connected to the output device, and wherein said two transmission devices are each connected to the rotor and to the shaft.

9. The single body motor/generator dual function device as claimed in any one of claims 1 to 4, wherein the power output device comprises a differential, torque converter, third transmission device or a combination of the differential, torque converter or third transmission device for providing a change of torque, velocity, direction or other required functions.

\* \* \* \* \*